United States Patent

Gohdo et al.

[11] Patent Number: 5,905,592
[45] Date of Patent: May 18, 1999

[54] LASER THEODOLITE

[75] Inventors: Etsuji Gohdo; Takashi Maezawa; Michiyo Saito, all of Tokyo, Japan

[73] Assignee: Kabushiki Kaisha TOPCON, Tokyo, Japan

[21] Appl. No.: 08/919,832

[22] Filed: Aug. 28, 1997

[30] Foreign Application Priority Data

Oct. 29, 1996 [JP] Japan .................................. 8-286419

[51] Int. Cl.⁶ ............................ G02B 23/00; G02B 6/26
[52] U.S. Cl. ............................ 359/424; 359/399; 385/88
[58] Field of Search ............................ 359/362–363, 359/399–400, 402, 404, 407, 424, 427–428, 641; 372/79, 36; 385/33, 88, 92, 94; 33/233–248, 292–298

[56] References Cited

U.S. PATENT DOCUMENTS

| 3,786,370 | 1/1974 | Barry et al. | 372/79 |
| 5,505,000 | 4/1996 | Cooke | 33/DIG. 21 |
| 5,513,044 | 4/1996 | Kubo | 359/399 |
| 5,745,623 | 4/1998 | Ohtomo et al. | 385/88 |

*Primary Examiner*—Thong Nguyen
*Attorney, Agent, or Firm*—Limbach & Limbach, LLP

[57] ABSTRACT

A laser theodolite is provided which comprises a telescope (6), a focusing lens (10) and a reticle (12) provided in the telescope, a polarization beam splitter (13') provided on an optical axis (O) between the focusing lens and the reticle for reflecting a laser beam (S1) in a direction of collimation, and a laser-beam light source portion (16) for emitting the laser light toward the polarization beam splitter (13'). The laser-beam light source portion (16) and the reticle (12) are conjugate with respect to the polarization beam splitter (13').

9 Claims, 5 Drawing Sheets

F I G. 3(a)
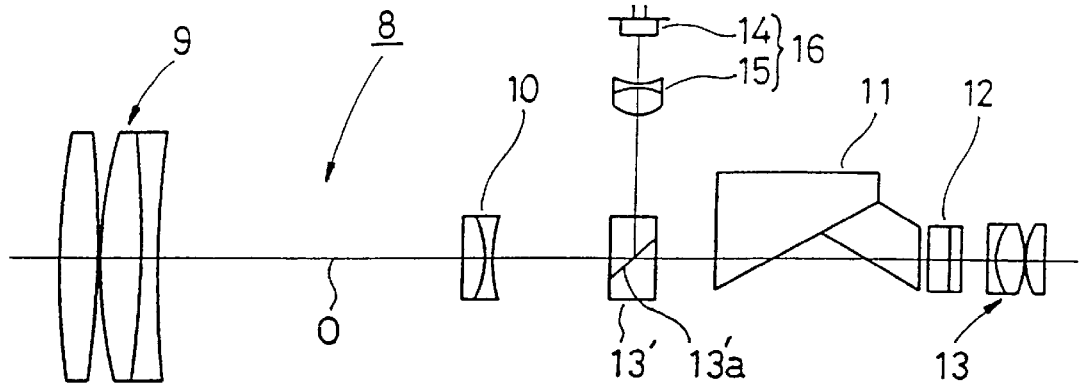
F I G. 3(b)
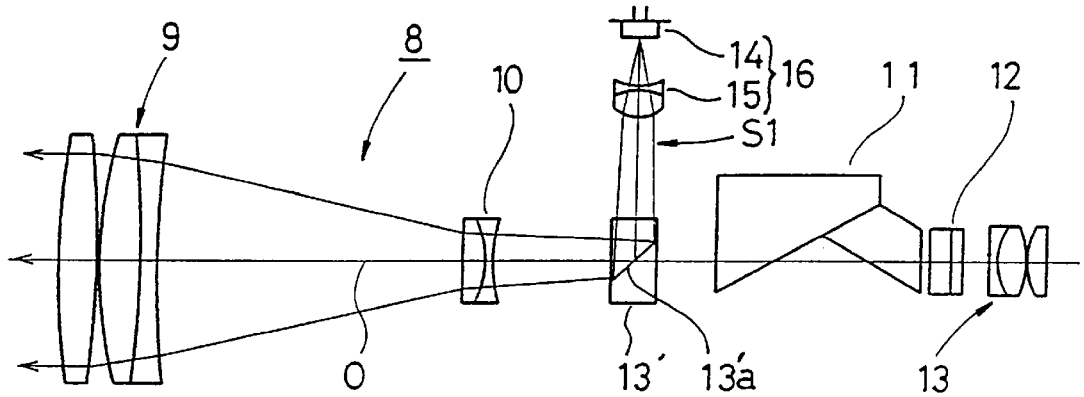
F I G. 3(c)
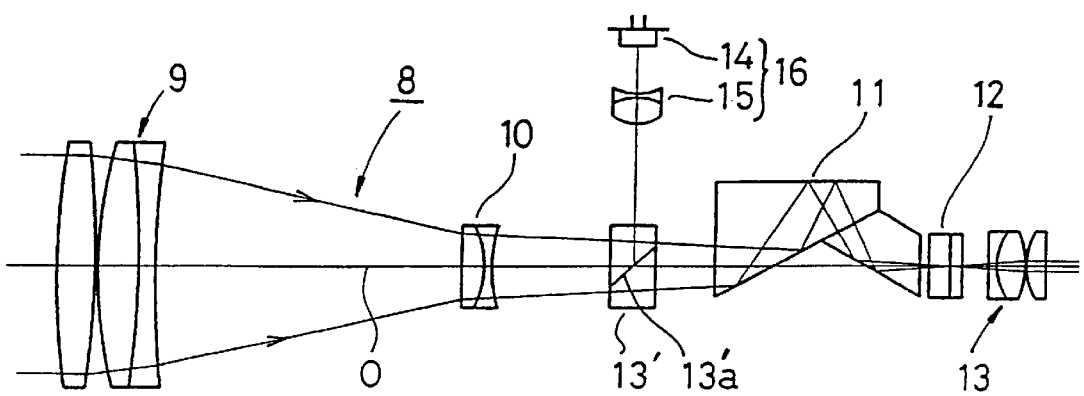

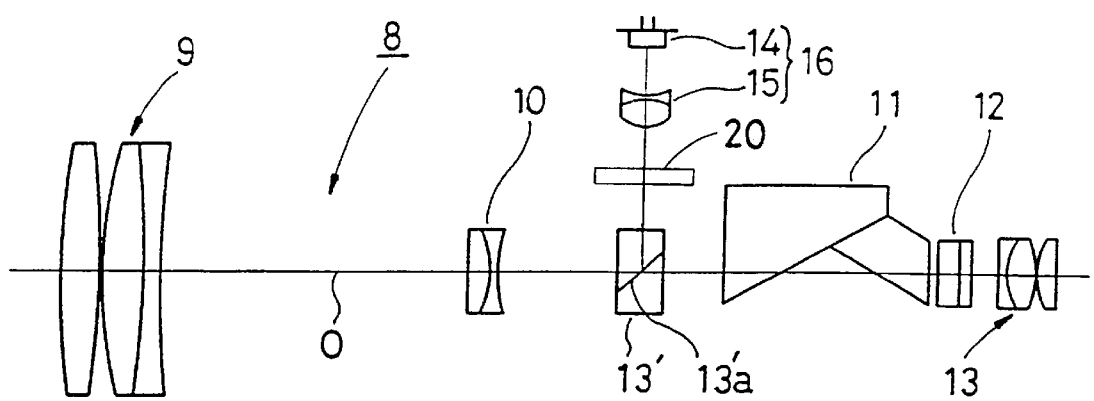

LASER THEODOLITE

BACKGROUND OF THE INVENTION

1. Field of the Invention

The present invention relates to an improvement in a laser theodolite capable of emitting a laser beam in a direction of collimation.

2. Description of the Related Art

An optical structure such as that shown in FIG. 1 is known as a laser theodolite. An objective lens 50, a focusing lens 51, a reticle 52, and an eyepiece 53 are provided within the lens barrel of the telescope of the laser theodolite. Also, there is provided a half mirror 54 between the focusing lens 51 and the reticle 52. With this arrangement, a laser beam from a helium-neon laser light source 55 is reflected in a direction of collimation. Furthermore, a movable laser-beam focusing lens 56, a total reflecting mirror 57, and a movable laser-beam focusing lens 58 are provided between the helium-neon laser light source 55 and the half mirror 54. If the movable lenses 56 and 58 are moved in the optical axis direction, a laser beam from the helium-neon laser light source 55 is focused at position Q and a real image is formed. A lens 59 is provided between the movable lens 58 and the half mirror 54. The focal distance of the lens 59 is longer than the distance from the position of the lens 59 to the position Q. The virtual image Q' at the position Q which is formed by the lens 59 and the reticle 52 are conjugate with respect to the half mirror 54.

However, in this conventional laser theodolite, the half mirror 54 reflects part of the laser beam in a direction of collimation and transmits the remaining part from the essential nature of the half mirror 54. Also, the half mirror 54 reflects part of collimated light, which is incident from a collimation point existing in the direction of collimation toward the collimating system of the telescope, and at the same time, transmits the remaining part. Because of the existence of the half mirror 54, part of the collimated light is reflected and the visual field becomes dark, and consequently, this conventional laser theodolite has the disadvantage that the surveying operation is difficult to perform accurately and quickly. Also, when the laser beam from the helium-neon laser light source 55 is reflected in the direction of collimation by the half mirror 54, part of the laser beam is transmitted through the half mirror 54. For this reason, the light quantity of the laser beam which is reflected toward the collimation point by the half mirror 54 is reduced. Similarly, part of the reflected laser beam from the collimation point is reflected by the half mirror 54, and the reflected laser beam which is transmitted toward the reticle 52 is reduced in quantity. Consequently, there is the disadvantage that the reflected laser beam from the collimation point is also difficult to collimate. Furthermore, the laser beam, transmitted in the direction of collimation without being reflected by the half mirror 54, becomes a ghost image easily. For example, in the case where visual laser light with red color is employed, the conventional laser theodolite has the disadvantage that the entire visual field looks reddish.

SUMMARY OF THE INVENTION

Accordingly, it is an objective of the present invention to provide a laser theodolite which is capable of lightening a visual field and easily recognizing a laser beam reflected at a collimation point.

To achieve the aforementioned objective of the present invention, a laser theodolite according to the present invention comprises a telescope, a focusing lens and a reticle provided in the telescope, a polarization beam splitter provided on an optical axis between the focusing lens and the reticle for reflecting a laser beam toward an object, and a laser-beam light source portion for emitting the laser light toward the polarization beam splitter. The laser-beam light source portion and the reticle are conjugate with respect to the polarization beam splitter.

The laser-beam light source portion emits a laser beam toward the polarization beam splitter. The polarization beam splitter reflects the laser beam in the direction of collimation and transmits the reflected laser beam from a collimation point existing in the collimation direction toward the reticle.

In a first form of the present invention, a polarizing means is provided between the polarization beam splitter and the laser-beam light source and transmits the laser beam which is reflected in the direction of collimation by the polarization beam splitter.

In a second form of the present invention, the telescope is provided in a pair of support portions so that it is rotatable, and a drive power supply portion for the laser-beam light source portion is provided in one of the pair of support portions so that electric power is supplied from the drive power supply portion to the laser-beam light source portion through a slip ring.

In a third form of the present invention, a light-source housing portion for housing the laser-beam light portion is provided in the collimating telescope so as to project from the collimating telescope.

In a fourth form of the present invention, the light-source housing portion serves as a radiation portion which radiates heat generated from the semiconductor laser.

In a fifth form of the present invention, a star illumination portion for performing rough collimation is provided on the top of the light-source housing portion.

In a sixth form of the present invention, a battery pack is provided in the other of the pair of support portions.

BRIEF DESCRIPTION OF THE DRAWINGS

The present invention will be described in further detail with reference to the accompanying drawings wherein:

FIG. 3(a) is a schematic view of the optical system of the laser theodolite according to the present invention;

FIG. 3(b) is a schematic view used to explain how a laser beam is emitted from the optical system toward a collimation point in a direction of collimation;

FIG. 3(c) is a schematic view used to explain how a collimated beam coming from the collimation point is focused;

FIG. 3(d) is a schematic view like FIG. 3(a) with the addition of a polarizing filter.

DETAILED DESCRIPTION OF THE PREFERRED EMBODIMENT

Figure 1:
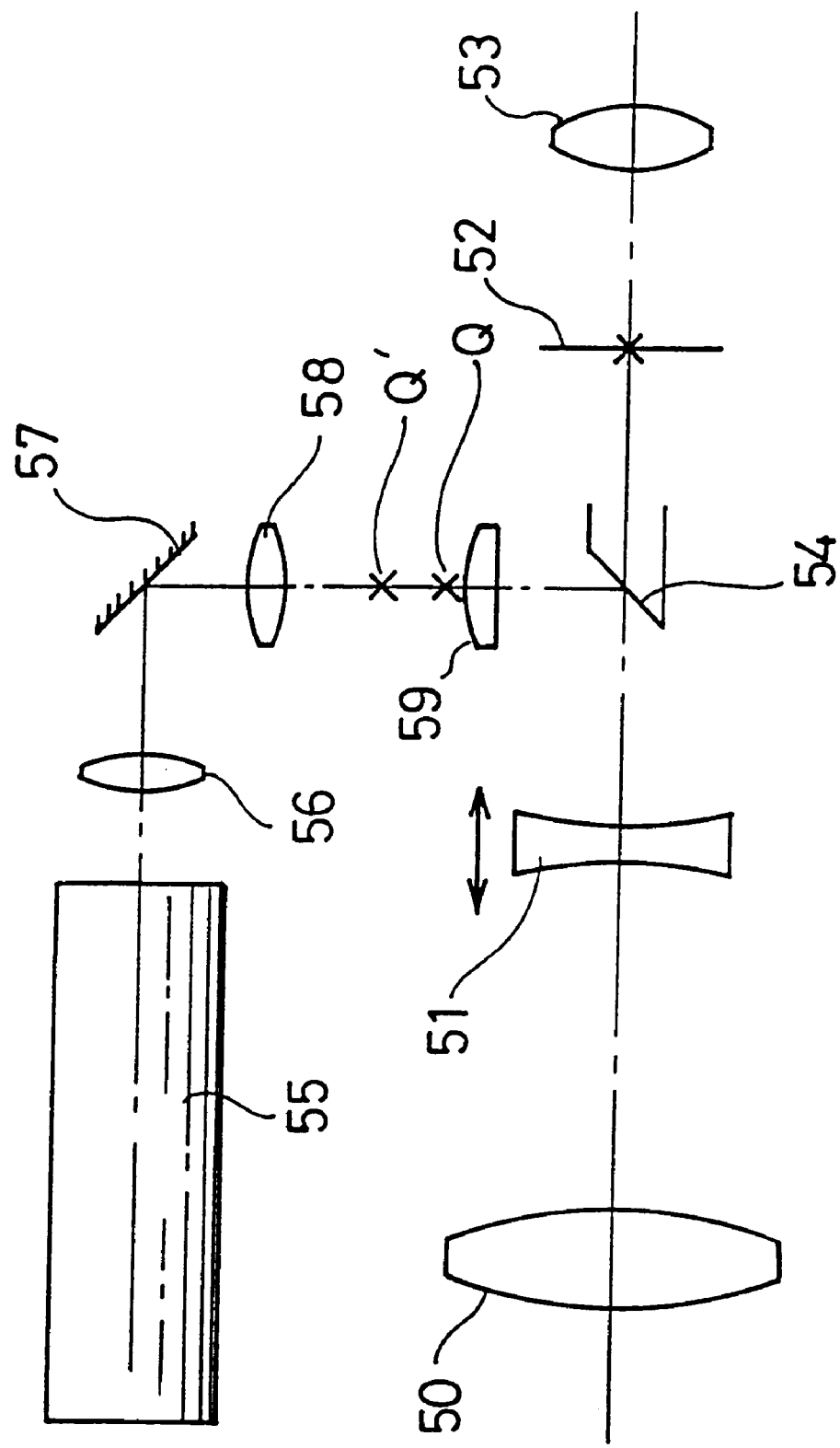
FIG. 1 is a schematic view showing the optical system of a conventional laser theodolite.
Figure 2:
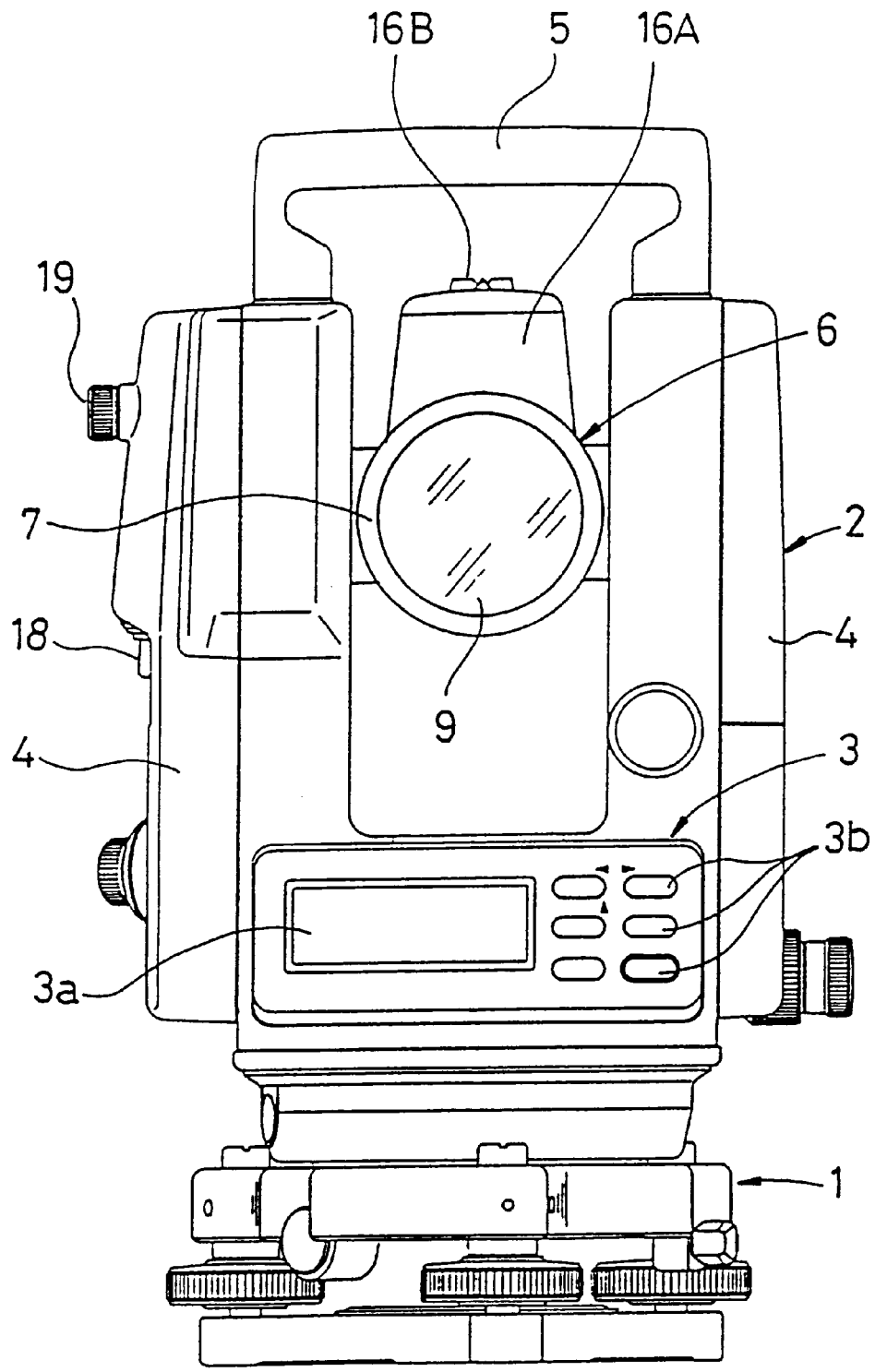
FIG. 2 is a front view of a laser theodolite according to the present invention.

Referring to FIG. 2, there is shown a laser theodolite in accordance with a preferred embodiment of the present invention. In the figure, reference numerals 1 and 2 denote the base and the main body of the laser theodolite, respectively. The main body 2 is rotatable within a horizontal plane with respect to the base 1. The main body 2 has a display control portion 3 and a pair of support portions 4. The display control portion 3 is provided with a screen 3a and control buttons 3b. A grip 5 is bridged between the pair of support portions 4.

A telescope portion 6 is provided in the intermediate portion of the main body 2 between the pair of support portions 4 so that the telescope portion 6 is rotatable within a vertical plane. There is provided an optical collimation system 8 in the mirror barrel 7 of the telescope portion 6.

The optical collimation system 8 has an objective lens 9, a focusing lens 10, an erecting prism 11, a reticle 12, and an eyepiece 13, as shown in FIGS. 3(a) through 3(c). By moving the focusing lens 10 along the optical axis O of the optical collimation system 8, an image at a collimation point existing forward in a direction of collimation is formed on the reticle 12, while the laser light from the image is being focused on the reticle 12.

A polarization beam splitter 13' is provided between the focusing lens 10 and the erecting prism 11. The polarization beam splitter 13' has an important role in reflecting a laser beam S1 toward a collimation point, as described later.

The laser beam S1 is generated by a semiconductor laser 14, and usually, the laser light S1 that is emitted from the semiconductor laser 14 is linearly polarized light. In this embodiment, the laser light beam S1 is assumed to be S-polarized light. The laser light beam S1 is focused by a collective lens 15 and is conducted to the polarization beam splitter 13'. The polarization beam splitter 13' has a reflecting surface 13'a, which reflects S-polarized light and transmits P-polarized light.

The position at which the semiconductor laser 14 is disposed is within the focal distance of the collective lens 15. The light emitting point of the semiconductor laser 14 and the reticle 12 are conjugate with respect to the focusing lens 10.

The semiconductor laser 14 and the collective lens 15 as a whole constitute a laser-beam light source portion 16. The laser-beam light source portion 16 is housed in a light-source housing portion 16A shown in FIG. 2. The light-source housing portion 16A is provided so as to project from the mirror barrel 7 and serves as a radiation portion which radiates the heat generated by the semiconductor laser 14. A star illumination portion 16B for performing rough collimation is provided on the top of the light-beam housing portion 16A.

A laser beam S1, emitted from the laser-beam light source 16, is first conducted to the polarization beam splitter 13' while spreading out, as shown in FIG. 3(b). Thereafter, the laser beam S1 is reflected by the reflecting surface 13a' and is conducted to the focusing lens 10. The laser beam S1 is further spread out by the focusing lens 10, and a focused image is formed at a collimation point by the objective lens 9.

The collimated light coming from the collimation point to the objective lens 9 is first caused to pass through the focusing lens 10 and is transmitted through the polarization beam splitter 13' and the erecting prism 11, as shown in FIG. 3(c). Thereafter, the collimated light is focused on the reticle 12, and a collimated image is formed on the reticle 12. Therefore, the surveying operator can view the collimated image formed on the reticle 12 through the eyepiece 13. The laser light, reflected at the collimation point and incident on the telescope portion 6, is likewise transmitted through the objective lens 9 and the focusing lens 10 and is conducted to the polarization beam splitter 13'.

The reflected light of the laser light, focused at the collimation point, has a P-polarized light component where the direction of polarization is rotated when reflected at the collimation point. Therefore, the reflected light is transmitted through the polarization beam splitter 13' and conducted to the reticle 22. Since the light emitting point of the semiconductor laser 14 and the reticle 12 are conjugate with respect to the focusing lens 10, the reflected spot of the laser light from the collimation point is formed on the reticle 12. Therefore, the surveying operator can collimate the telescope portion 6 with the image on the collimation point and the reflected point of the laser light superimposed on each other.

Figure 4:
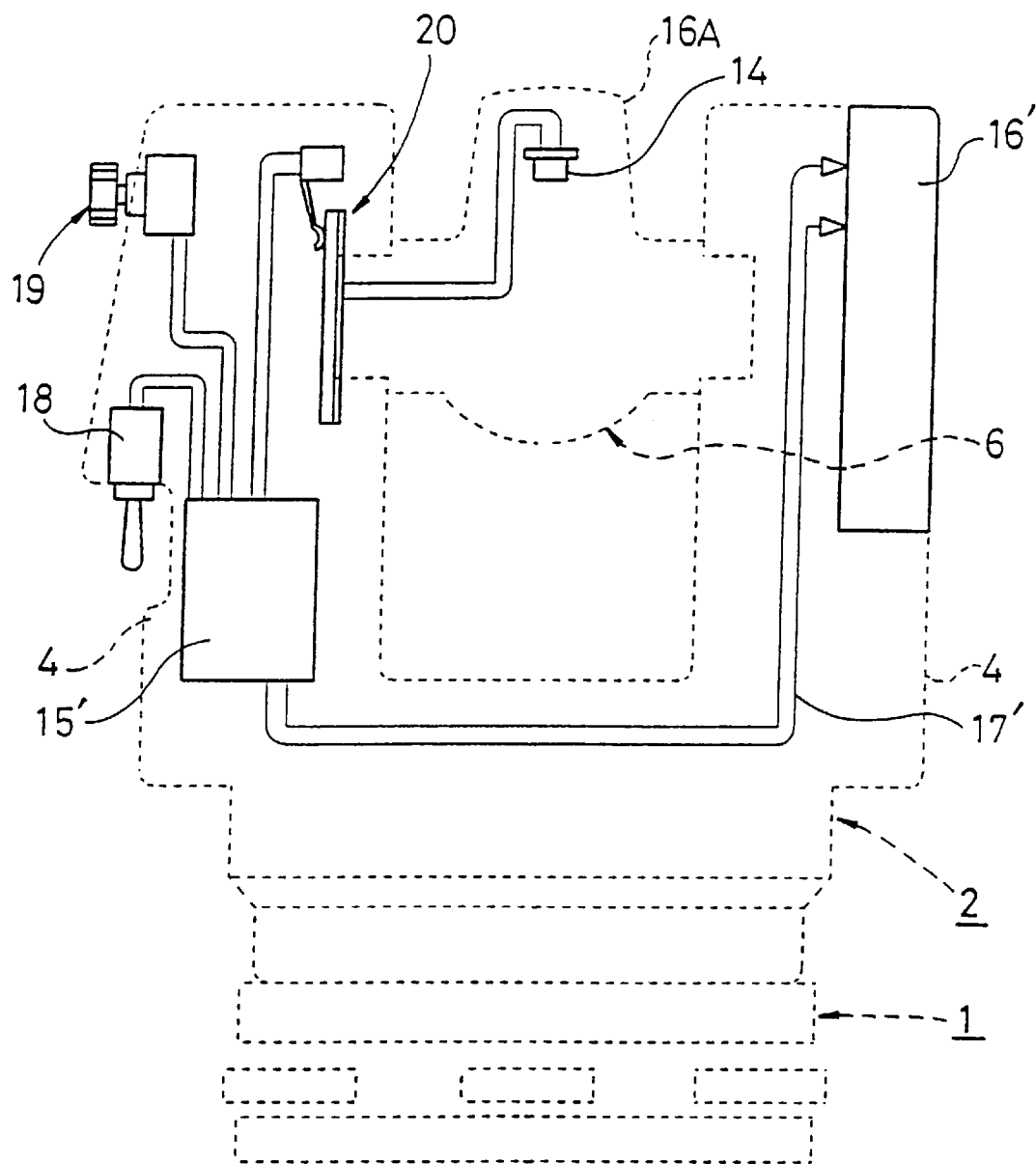
FIG. 4 is a schematic view used to explain how a semiconductor laser of the laser theodolite according to the present invention is driven and illustrates the disposition and connection relation between the semiconductor laser, a power supply, and a laser drive portion.

The semiconductor laser 14 is driven by a laser drive portion 15', as shown in FIG. 4. The laser drive portion 15' is disposed and housed in one of the support portions 4. The other support portion 4 has a battery pack 16' (as a power supply portion) incorporated therein. The laser drive portion 15' and the battery pack 16' are interconnected by a power supply line 17'. Since the laser drive portion 15' and the battery pack 16' are disposed separately in the pair of support portions 4 opposed with each other across the telescope portion 6, the weight balance in the main body 2 becomes favorable. Alternatively, the power supply may be located in the main body 2 of the laser theodolite.

The laser drive portion 15' has an operating switch 18 and a light quantity adjusting volume 19. The operating switch 18 and the light quantity adjusting volume 19 are attached to the side surface of one of the support portions 4. A slip ring 20 is provided in the one support portion 4 so that the electric power of the laser drive portion 15' is supplied to the semiconductor laser 14 through the slip ring 20.

If the operating switch 18 is turned on, the semiconductor laser 14 is turned on. If the light quantity adjusting volume 19 is adjusted, drive current to the semiconductor laser 14 is varied. The semiconductor laser 14 is much smaller than a helium-neon laser, so the rotating operation of the telescope portion 6 on a vertical plane is easy and the drive power is much smaller than that of the helium-neon laser.

While a description has been given of the preferred embodiment of the present invention, a polarizing filter 20 may be provided between the semiconductor laser 14 and the polarization beam splitter 13' as shown in FIG. 3(d), because the semiconductor laser 14 includes some different polarized light components. For example, by providing a polarizing filter so that P-polarized light is transmitted, transmission of an excess of S-polarized light can be prevented and an occurrence of a ghost image can be prevented.

Since the laser theodolite according to the present invention is constructed as described above, it has the advantage that the visual field can be lightened and that the reflected laser beam from the collimation point can be easily recognized.

In addition, since the drive power for a semiconductor laser is supplied through a slip ring, the telescope is freely rotatable.

Furthermore, because the housing portion for the semiconductor laser is formed into a shape from which heat is easily radiated, the influence of the heat of the semiconductor laser on the telescope can be minimized and the accuracy in the collimation of the telescope can be guaranteed.

What is claimed is:

1. A laser theodolite comprising:

a telescope;

a focusing lens and a reticle provided in said telescope;

a polarization beam splitter, provided on an optical axis between said focusing lens and said reticle, for reflecting a laser beam toward an object; and a laser-beam light source portion for emitting said laser beam toward said polarization beam splitter, the laser-beam light source portion and said reticle being conjugate with respect to said polarization beam splitter.

2. The laser theodolite as claimed in claim 1, wherein said laser-beam light source portion comprises a semiconductor laser that emits a laser beam of linearly polarized light.

3. The laser theodolite as claimed in claim 2, wherein said laser-beam light source portion and said polarization beam splitter are arranged to reflect the laser beam of the linearly polarized light toward said object.

4. The laser theodolite as claimed in claim 2, wherein said telescope is supported by a pair of support portions so that it is rotatable and wherein a power supply portion for said laser-beam light source portion is provided in one of said pair of support portions so that electric power is supplied from said power supply portion to said laserbeam light source portion through a slip ring.

5. The laser theodolite as claimed in claim 4, wherein a light-source housing portion for housing said laser-beam light portion is provided in said telescope so as to project from said telescope.

6. The laser theodolite as claimed in claim 5, wherein said light-source housing portion serves as a radiation portion which radiates heat generated from said semiconductor laser.

7. The laser theodolite as claimed in claim 4, wherein a battery pack is provided in the other of said pair of support portions.

8. The laser theodolite as claimed in claim 1, wherein polarizing means is provided between said polarization beam splitter and said laser-beam light source portion and polarizes said laser beam which is reflected by said polarization beam splitter.

9. The laser theodolite as claimed in claim 1, wherein said telescope is rotatably supported by a pair of support portions, and a main body of said laser theodolite is provided with a power supply portion for said laser-beam light source portion so that electric power is supplied from said power supply portion to said laser-beam light source portion through a slip ring.

\* \* \* \* \*